3,463,397
FLUID SPRAYING SYSTEM
Charles D. Mecklin and James M. Francis, Memphis, Tenn., assignors to International Harvester Company, Chicago, Ill., a corporation of Delaware
Filed July 3, 1967, Ser. No. 650,806
Int. Cl. B05b 1/16, 9/00
U.S. Cl. 239—126                                          1 Claim

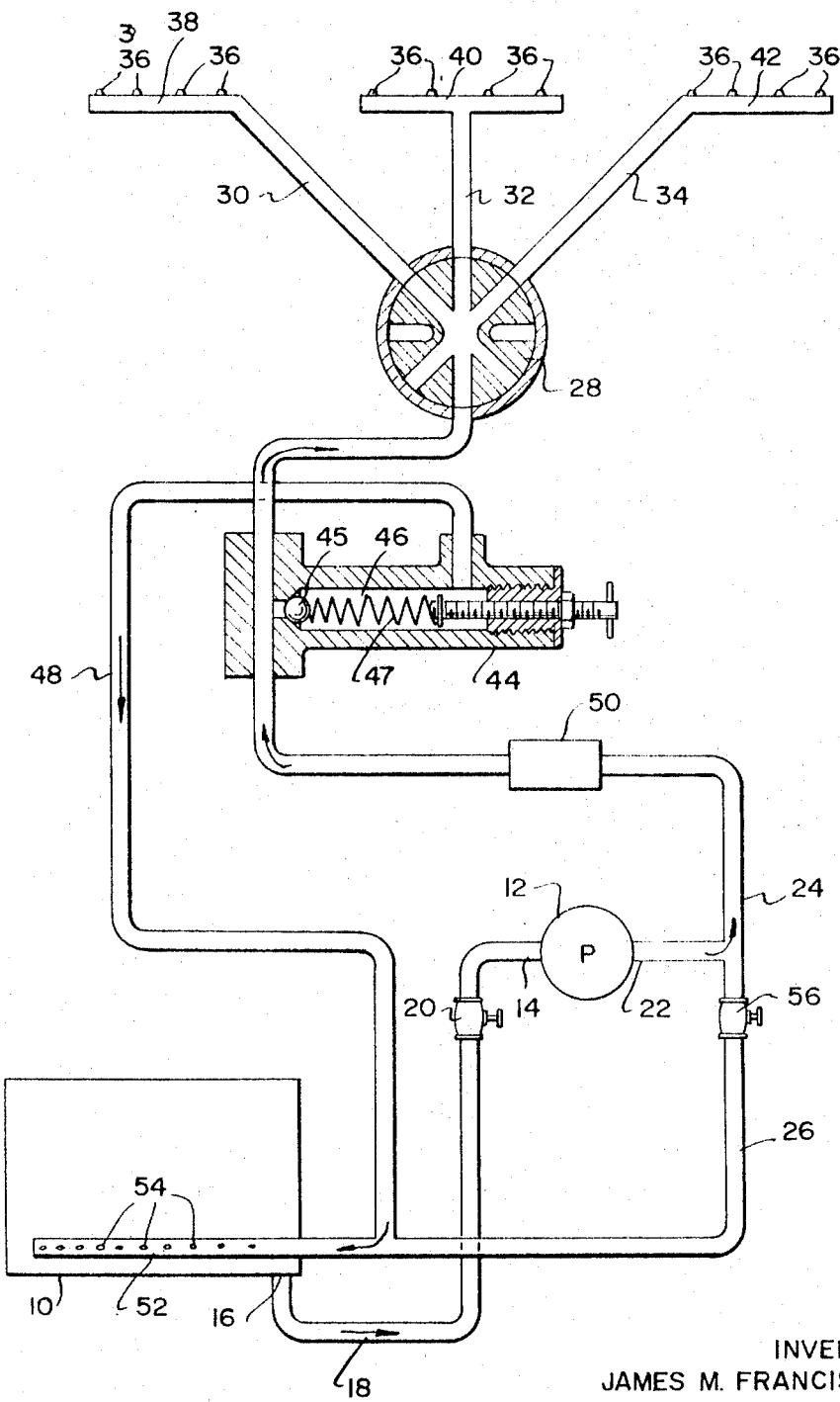

ABSTRACT OF THE DISCLOSURE

A fluid spraying system in which means are provided to recirculate a fluid mixture during the time that chemicals are being replenished by dissolution or dispersal in a fluid carrier to form a homogeneous mixture in order to prevent clogging of various parts of the system or applying a concentration of chemicals before complete mixing is accomplished. It is important that the pressure regulator, strainer, and distribution valve be kept as free from clogging as possible. This invention includes means for insuring that all the chemicals are completely dispersed before the fluid mixture is allowed to circulate through the whole system.

---

This invention relates to spray apparatus for applying fluids to soils in which crops are grown.

In liquid sprayers utilizing wettable powders which are put into solution, one of the potential problems is that of clogging of various parts of the apparatus, because these powders are sometimes insoluble and are rather difficult to disperse in order to form a suspension. Such clogging can occur when the wettable powder is first added to the fluid, usually water, utilized as the carrying agent. Clogging can also occur at a later stage, if provision is not made to prevent the wettable powders from settling out. It is particularly desirable, when wettable powders or soluble chemicals are first put into solution, that the chemicals be completely dispersed before the fluid mixture is sent through the whole system in order to reduce the possibility of clogging in various parts of the system, and to preclude applying an overdose.

It is a principal object of this invention to provide a fluid spraying system which will be effective to keep to a minimum the possibilities of clogging, resulting from the use of wettable powders in the fluid mixture to be sprayed, and to avoid applying an overdose of chemical due to incompletely mixed solutions.

A further object is to provide in a fluid spraying system means for thoroughly mixing the fluid mixture in a part of the system before the fluid mixture is permitted to move through the remainder of the system to the spray nozzles.

A further object is to provide in connection with a fluid spraying system a means for recirculation of the fluid mixture, operating substantially independent of the distribution system which is effective to achieve proper mixing of the chemicals put into solution.

Another object is to provide in a fluid spraying system an arrangement of valve means and strainer means which will be effective to reduce the possibility of clogging of such parts as the pressure regulator means disposed in the system and the spray nozzles associated with the system.

The above and other objects and advantages of the invention will be more readily apparent when read in conjunction with the accompanying drawing in which:

The figure is a schematic diagram of a fluid spraying system embodying the principles of the invention.

Referring now to the drawing, there is shown a tank or reservoir 10 for holding a fluid mixture which comprises a wettable powder in solution in water. This may be a herbicide or insecticide or other chemical commonly used to spray crops. A pump 12, having an inlet 14, is connected to an outlet 16 from tank 10 by a conduit 18. While the sprayer system is being used the pump 12 normally runs continuously. A shut-off valve 20 is interposed in conduit 18 between the tank outlet and the pump inlet. The pump 12 has an outlet 22 which discharges into a pair of interconnected conduits 24 and 26. Conduit 24 leads to a selector valve unit 28, which in turn has connected thereto spray means comprising a plurality of branch conduits 30, 32 and 34 to the ends of which are connected respectively a plurality of spray nozzles 36. The branch conduits lead respectively to three sections 38, 40 and 42. The selector valve, which may be of a conventional type, is adapted to determine to which of the conduits 30, 32 or 34 the fluid will be directed as well as having a completely "Off" position.

A pressure regulator 44, which may be of a conventional type, is interposed in conduit 24 upstream from the valve 28. Fluid discharged from the pump 12 under pressure passes through the regulator 44 to the valve 28. Since the pump 12 runs continuously and pressure continues to build up in conduit 24, the pressure regulator 44 is formed with a relief passage 46 so that when pressure builds up beyond a predetermined level, the regulator valve will open and fluid will be directed back to the reservoir 10 through the relief passage 46 and a conduit 48 connected between the relief passage 46 and the reservoir 10. As shown in the drawing, conduit 48 is actually connected to conduit 26 adjacent the latter's entrance into the reservoir 10. The pressure regulator 44, or relief valve as it may also be referred to, can be adjusted to relieve the pressure in the system at different pressures.

A strainer 50 is also disposed in conduit 24 between the discharge end of pump 12 and the inlet to the pressure regulator to filter out during normal circulation bits of powder which may have failed to dissolve during mixing. It will be observed that the strainer is disposed ahead of the pressure regulator 44, the selector valve 28 and the spray nozzles 36, thereby protecting each of those elements of the system.

As previously noted, conduit 26 is interconnected with conduit 24, both conduits being adapted to receive fluid under pressure from the pump 12. The conduit 26 leads back to the reservoir 10. Instead of discharging directly into the reservoir, the conduit 26 is connected to a tube-like agitating member 52, disposed within and near the bottom of the reservoir. The tube-like member 52 is formed with a plurality of orifices 54 through which liquid is discharged into the solution in the reservoir. The discharge through the orifices 54 keeps the solution agitated and prevents the chemical solids from settling out of solution. The discharge through orifices 54 may come either by way of overflow or relief pressure from the regulator 44 through conduit 48 or directly from pump 12, when a manual by-pass valve 56 in conduit 26 is opened.

Since one of the problems encountered in spray systems is the clogging of certain operating parts, an important feature of this invention is the provision of means for mixing the chemical powders into solution without sending partially dissolved chemicals through the whole system. Thus a recirculation system is provided which includes the manual by-pass valve 56. It is normally closed during regular operation of the system. When chemicals in the form of wettable powders are added to the system by adding them to the water in the reservoir 10, the valve 56 is opened. At the time of adding the chemicals, the pump has been running and there is fluid in conduit 24 right up to the selector valve 28. As the valve 56 is opened, the pump 12 recirculates its discharge directly back to the reservoir 10 through conduit 26 and the agitator tube 52 without sending partially undissolved chemicals into the rest of the system. When valve 56 is opened fluid pressure is exerted on both lines 24 and 26. Since normal spraying pressures are established at the pressure regulator 46 and the operator closes the selector valve, the fluid flows thru the line offering the least resistance which is the by-pass line. The pressure regulator remains closed under spring pressure. Thus with the by-pass valve open and the selector valve closed there is no flow past the strainer, pressure regulator and selector valve which would tend to clog those units. The valve 56 is left open for continued recirculation until all the newly added chemicals are dispersed. Then it is closed and normal circulation to the selector valve and spray nozzles becomes available.

In order to further provide protection against clogging, a filter unit or strainer 50 is incorporated in the system preferably being interposed in the conduit 24 between the pump discharge and the inlet to the pressure regulator 44. In this position, the strainer 50 is free from encountering a high concentration of chemicals, the wettable powder, when they are first added to the solution as has been previously explained. During normal circulation, when fluid is being sent through conduit 24, the strainer 50 intercepts particles that might otherwise come in contact with the pressure regulator, selector valve or spray nozzles thus protecting those units against clogging.

The shut-off valve 20 in conduit 18 between the outlet from reservoir 10 and the pump inlet 14 is normally open. It is closed when it is desirable to remove the strainer 50 for cleaning or some other reason. At such time, both the shut-off valve 20 and by-pass valve 56 are closed. It will be apparent that under such condition the strainer 50 may be easily dismantled without the loss of any substantial amount of fluid.

The operation of the sprayer system may be briefly summarized as follows. With chemicals already in solution in the fluid mixture in the reservoir 10, the system is ready to operate. In operating condition, the shut-off valve 20 will be open and the by-pass valve 56 will be closed. The pump 12 draws from the reservoir 10 through conduit 18 and discharges the fluid mixture under pressure through conduit 24, strainer 50, pressure regulator 44 and into selector valve 28. Depending on the setting of the selector valve, fluid will be distributed to one or more of the branch conduits 30, 32 or 34 and the spray nozzles 42 respectively associated therewith. Excess pressure in conduit 24 above that for which the pressure regulator 44 is set will cause the regulator to open, i.e., the ball 45 will move against the pressure of spring 47, permitting fluid to pass into the relief passage 46, out through conduit 48 and through the orifices 54 of the agitator tube 52 back into the reservoir 10. Discharge through the orifices 54 of the agitator tube keeps the solution agitated thus preventing solids from settling out of solution.

When additional spraying fluid is needed, water is added to the reservoir. Before chemicals are added, the by-pass valve 56 is opened. Now fluid is returned to the reservoir via conduit 26. At this stage, the fluid in conduit 24 to the regulator 44 and selector valve 28 remains static. As chemicals are now added, the pump 12 will effect mixing by recirculating fluid to the reservoir. When the mixing is complete, the valve 56 is closed and the movement of fluid is again directed through conduit 24 with excess pressure opening the pressure regulator 44 to allow discharge of fluid through the regulator and conduit 48 to the reservoir.

While the spraying apparatus herein described is particularly useful in the agricultural field in connection with the spraying of crops with herbicides, insecticides and the like, it will be appreciated that spraying apparatus for other purposes may well make use of the principles of this invention, where clogging of parts of the system is to be avoided and complete mixing of solutions is desired.

It will be apparent that we have advantageously provided a fluid spraying apparatus which reduces the possibilities of clogging problems or erratic application. This we have done by providing within the system itself means for mixing the chemicals into solution before they have contact with the parts of the system which are most subject to clogging difficulties. In addition, means have been provided to filter the already well mixed solution before it reaches the parts which are subject to clogging.

While a preferred embodiment of the invention has been specifically disclosed, it is to be understood that the invention is not limited thereto as other variations will be apparent to those skilled in the art.

We claim:
1. A fluid spraying apparatus comprising:
a fluid reservoir for holding a fluid to be sprayed;
a pump having an inlet and an outlet, said inlet being connected to take suction from said reservoir;
first conduit means connected to the outlet of said pump and having a plurality of spray means connected thereto;
selector valve means in said first conduit means for selectively directing the fluid discharge from said pump to selected ones of the spray means;
pressure regulator means in said first conduit means, said regulator means having a relief pressure outlet connected to said reservoir for returning fluid to said reservoir as pressure builds up in said first conduit means beyond a predetermined pressure;
strainer means in said first conduit means upstream from said pressure regulator means;
a normally open valve interposed between the outlet of said reservoir and the inlet of said pump and adapted to be closed along with said selector valve means to block fluid flow in said first conduit means whereby access to said strainer means is facilitated;
agitator tube means disposed in said reservoir in fluid communication with said relief pressure outlet to permit flow into said reservoir for mixing the fluid therein in response to pressures in said first conduit means beyond said predetermined pressure;
second conduit means interconnecting the outlet of said pump and said agitator tube means whereby fluid may be recirculated to said reservoir; and
normally closed valve means interposed in said second conduit means for diverting flow from said first conduit means to said second conduit means and through said agitator tube means into said reservoir to effect mixing of the fluid to be sprayed.

No references cited.

M. HENSON WOOD, Jr., Primary Examiner

MICHAEL Y. MAR, Assistant Examiner

U.S. Cl. X.R.

134—103; 137—108; 239—127, 142